W. DYE.
SPRING WHEEL.
APPLICATION FILED JUNE 22, 1915.

1,176,705.

Patented Mar. 21, 1916.
2 SHEETS—SHEET 1.

Inventor,
Walter Dye.

Witnesses:
C. Feinle Jr.
Jno J McCarthy

By Victor J. Evans,
Attorney.

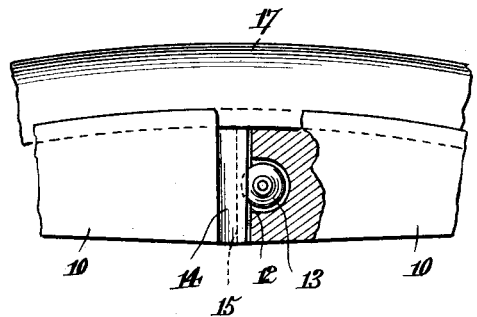
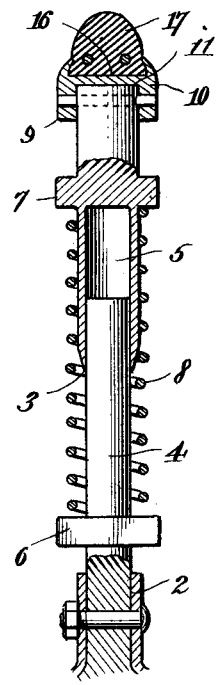
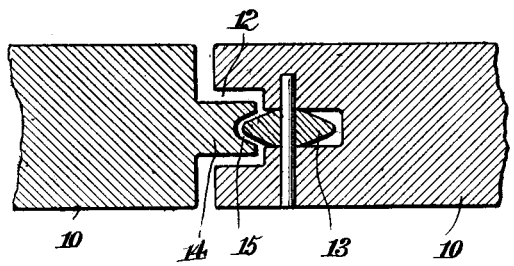

UNITED STATES PATENT OFFICE.

WALTER DYE, OF PRAIRIE GROVE, ARKANSAS.

SPRING-WHEEL.

1,176,705. Specification of Letters Patent. Patented Mar. 21, 1916.

Application filed June 22, 1915. Serial No. 35,666.

*To all whom it may concern:*

Be it known that I, WALTER DYE, a citizen of the United States, residing at Prairie Grove, in the county of Washington and State of Arkansas, have invented new and useful Improvements in Spring-Wheels, of which the following is a specification.

This invention relates to improvements in spring wheels and has particular application to a wheel of the sectional felly type.

In carrying out the present invention, it is my purpose to provide a spring wheel wherein the sections of the felly will be placed end to end and the confronting ends thereof equipped with anti-friction bearings designed to reduce the friction between the ends of the sections and enable such sections to move freely relatively when an obstruction or a depression in the path of travel of the wheel is encountered.

With the above and other objects in view, the invention consists in the construction, combination and arrangement of parts hereinafter set forth in and falling within the scope of the claim.

Figure 1:
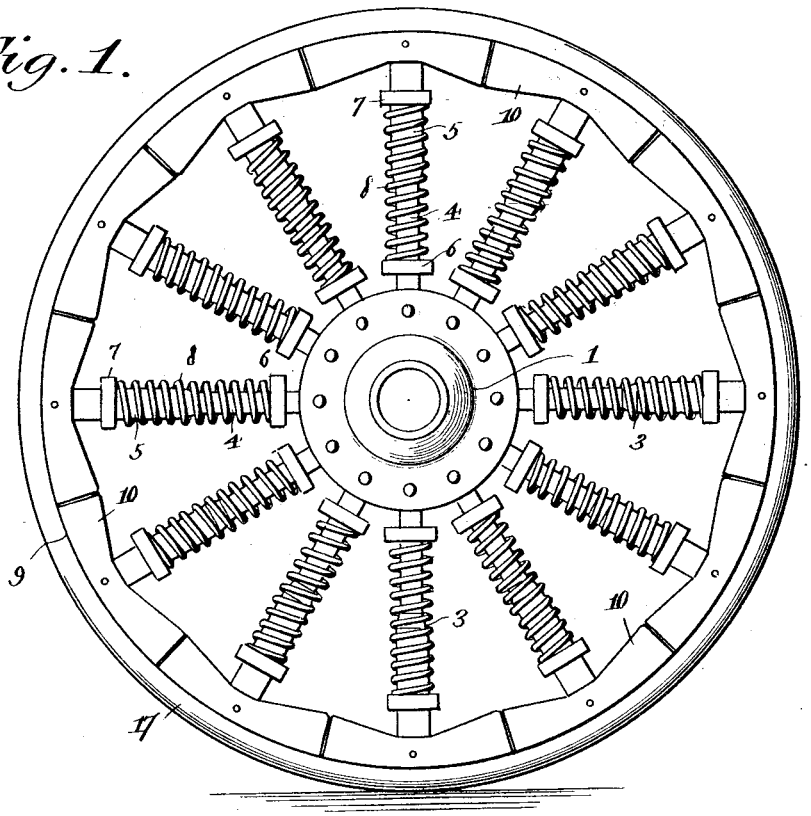
Figure 2:
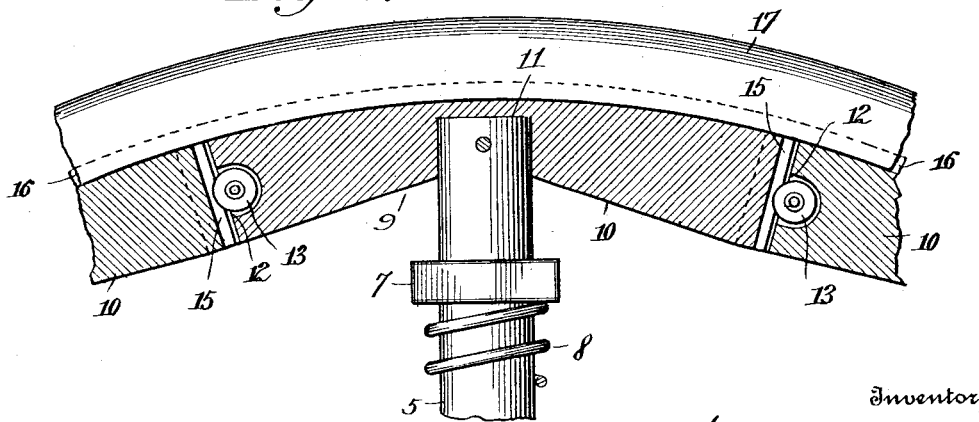

In the accompanying drawings, Figure 1 is a view in side elevation of a spring wheel constructed in accordance with my present invention. Fig. 2 is an enlarged fragmentary vertical longitudinal sectional view therethrough. Fig. 3 is an enlarged fragmentary side elevation of the felly of the wheel showing the anti-friction bearings between the confronting ends of the sections. Fig. 4 is a fragmentary longitudinal sectional view through the felly. Fig. 5 is an enlarged sectional view through one of the spokes of the wheel.

Referring now to the drawings in detail, 1 designates a hub having the circular wall formed with radial sockets 2. Disposed within the sockets 2 and radiating from the hub are spokes 3. In the present instance, each spoke comprises an inner section 4 having one end secured within the particular socket, and the outer section 5 hollow in construction and slidably mounted upon the outer end of the inner section 4. Adjustably mounted upon the inner section 4 is a nut 6, while formed on the outer section 5 is a flange 7 and interposed between the nut 6 and flange 7 is a coiled expansion spring 8 acting to hold the sections normally distended.

9 designates a felly comprising sections 10 having the inner edges thereof formed with sockets 11 designed to receive the outer ends of the sections 5, respectively. These sections 10 are placed in end to end contact and formed in one end of each section is a groove 12 and rotatably mounted upon an axle carried by the side walls of the groove 12 is a knife edged bearing roller 13. The opposite end of each section 10 is formed with a tongue 14 projecting into the groove 12 of the adjacent section and having the extremity thereof provided with a groove 15 designed to receive the knife edge of the roller 13. The periphery of the felly formed of the sections 10 is provided with a channel 16 carrying a solid rubber tire 17.

In practice, when the wheel is in motion, the sections 10 of the felly 9 are enabled to move relatively to one another, against the action of the springs 8, the sections of the spokes telescoping in the relative movement of the felly sections. Thus, any inequalities in the roadway over which the wheel is traveling may be compensated therefor.

I claim:

A spring wheel comprising a hub, spokes radiating from said hub and comprising spring actuated sections, a felly comprising sections secured to the outer ends of said spokes, respectively, and placed end to end, each section having one end thereof formed with a groove, an axle carried by the side walls of said groove, a knife edged roller rotatably mounted upon said axle, and a tongue formed on the remaining end of each section and projecting into the groove of the adjacent section and having the extremity thereof provided with a groove receiving the knife edge of the adjacent roller.

In testimony whereof I affix my signature in presence of two witnesses.

WALTER DYE.

Witnesses:
F. H. CARL,
J. O. BAIN.

Copies of this patent may be obtained for five cents each, by addressing the "Commissioner of Patents, Washington, D. C."